(12) United States Patent
Prasad et al.

(10) Patent No.: US 12,332,400 B2
(45) Date of Patent: Jun. 17, 2025

(54) LITHIUM DETECTION TECHNIQUES USING NEUTRONS AND/OR ALPHA PARTICLES

(71) Applicant: Schlumberger Technology Corporation, Sugar Land, TX (US)

(72) Inventors: Shikha Prasad, Sugar Land, TX (US); Vasudhaven Sudhakar, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/792,690

(22) Filed: Aug. 2, 2024

(65) Prior Publication Data

US 2025/0044476 A1 Feb. 6, 2025

Related U.S. Application Data

(60) Provisional application No. 63/517,616, filed on Aug. 4, 2023, provisional application No. 63/517,615, filed on Aug. 4, 2023.

(51) Int. Cl.
| | |
|---|---|
| *G01V 5/10* | (2006.01) |
| *E21B 49/08* | (2006.01) |
| *G01N 23/22* | (2018.01) |
| *G01N 23/222* | (2006.01) |
| *G01V 5/08* | (2006.01) |

(52) U.S. Cl.
CPC ............. *G01V 5/10* (2013.01); *E21B 49/081* (2013.01); *G01N 23/22* (2013.01); *G01N 23/222* (2013.01); *G01V 5/085* (2013.01); *G01N 2223/081* (2013.01); *G01N 2223/1045* (2013.01); *G01N 2223/106* (2013.01); *G01N 2223/5055* (2013.01); *G01N 2223/616* (2013.01)

(58) Field of Classification Search
CPC .......... G01N 23/222; G01V 5/04; G01V 5/10; G01V 5/101; G01V 5/102; E21B 49/081
See application file for complete search history.

(56) References Cited

U.S. PATENT DOCUMENTS 2,926,259 A * 2/1960 Dewan .................. G01V 5/101
250/269.6
11,555,941 B1 * 1/2023 Schmid .................. G01V 5/108

FOREIGN PATENT DOCUMENTS

RU 2771438 C1 * 5/2022

* cited by examiner

*Primary Examiner* — Sharon M Davis
(74) *Attorney, Agent, or Firm* — Jeffrey D. Frantz

(57) ABSTRACT

A system includes one or more neutron sources configured to emit neutrons. The system also includes one or more electron detectors configured to detect electrons. Further, the system includes a control system comprising one or more processors. The control system is configured to determine a lithium concentration based on the electrons. Further, the control system is configured to generate a lithium extraction output based on the lithium concentration.

9 Claims, 4 Drawing Sheets

LITHIUM DETECTION TECHNIQUES USING NEUTRONS AND/OR ALPHA PARTICLES

CROSS-REFERENCE TO RELATED APPLICATIONS

This application claims the benefit of U.S. Provisional Application No. 63/517,615, filed Aug. 4, 2023, and U.S. Provisional Application No. 63/517,616, filed Aug. 4, 2023.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Lithium is a key element in energy storage. Electrical storage devices, such as batteries, supercapacitors, and other devices commonly use lithium to mediate the storage and release of chemical potential energy as electrical current. With increasing need for reduction in greenhouse gases (GHG) and demand for fuel cell energy storage for electric (EV) and hybrid vehicles (HEV); renewable, but non-transportable, energy sources such as solar and wind energy for various applications including smart-grids grows, demand for technologies to store energy generated using such sources also grows.

According to the United States Geological Survey, global reserves of lithium total 22 million tons (metric) of lithium content, with Chile, Australia, Argentina, and China accounting for about 85% of global reserves. U.S. Geological Survey, Mineral Commodity Summaries, January 2022. According to S&P Global Market Intelligence, lithium supply is forecast to be 636 kT LCE in 2022, up from 497 kT in 2021. Global consumption was estimated at 64 kT in 2021, putting current lithium supplies in deficit. Global consumption is expected to reach 2 MT by 2030 for an average annual growth in demand of approximately 13.5%. Supply is currently forecast to run behind demand, and lithium prices currently outstrip even the most optimistic forecasts. While lithium prices are quite volatile as the global market develops, lithium prices are expected to remain high through 2030. Accordingly, it is recognized that it is desirable to improve techniques related to lithium production.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In certain embodiments, a system includes one or more neutron sources that emit neutrons. The system also includes one or more electron detectors that detect electrons. Further, the system includes a control system having one or more processors. The control system determines a lithium concentration based on the electrons. Further, the control system generates a lithium extraction output based on the lithium concentration.

In certain embodiments, a method includes providing a lithium-containing sample. The method also includes emitting neutrons into the lithium-containing sample. Further, the method includes detecting electrons subsequent to emitting the neutrons. The electrons correspond to—tritium decay associated with lithium in the lithium-containing sample. Further still, the method includes determining a lithium ion concentration based on the detected electrons. Even further, the method includes adjusting one or more operations of a lithium extraction system based on the lithium ion concentration.

In certain embodiments, a downhole tool system includes one or more alpha particle sources that emit alpha particles. The downhole tool system also includes one or more neutron detectors that detect neutrons, following the emission of the alpha particles. Further, the system includes a control system having one or more processors. The control system determines a lithium concentration based on the neutrons. The control system also generates a lithium extraction output based on the lithium concentration.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
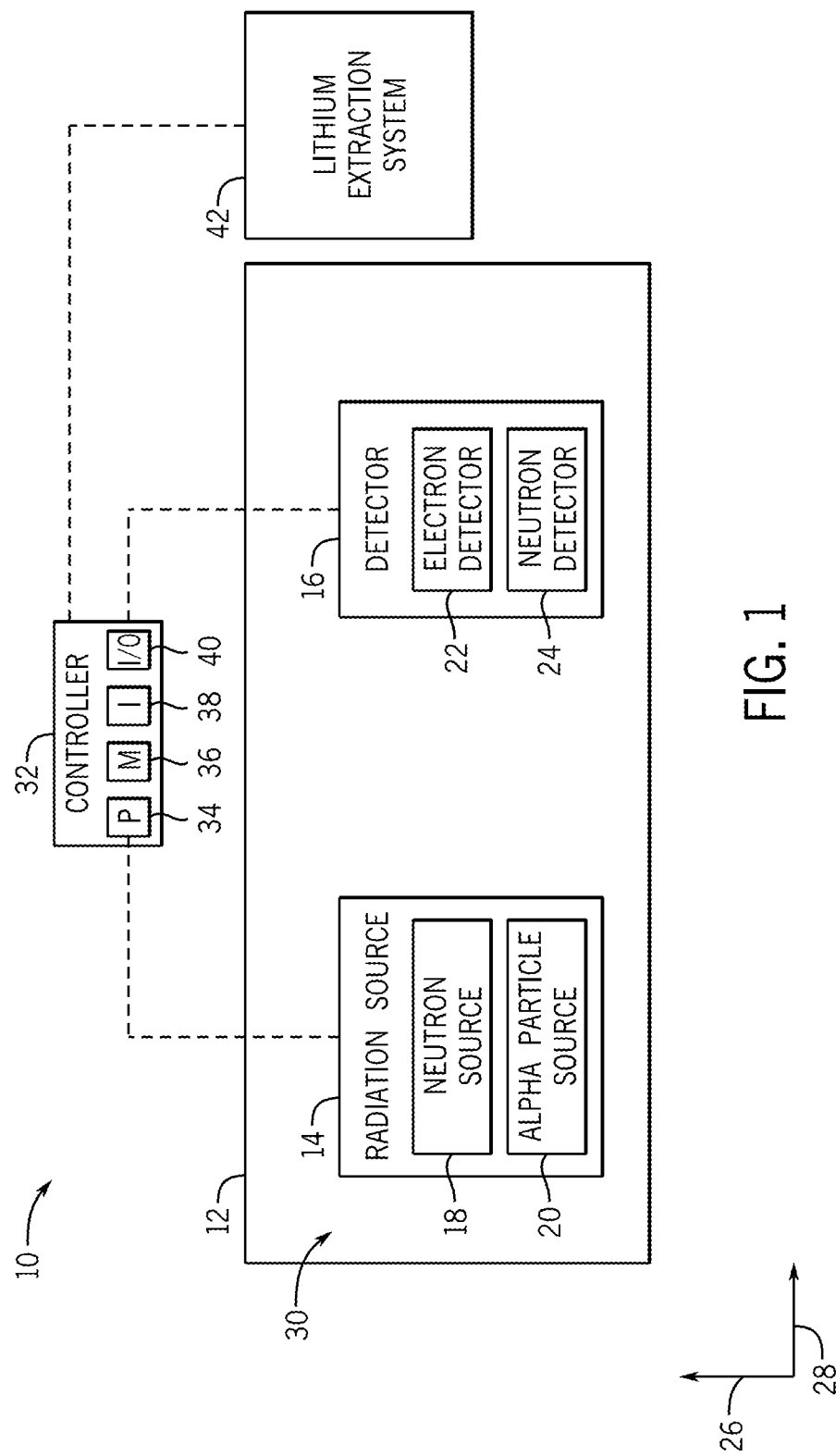
FIG. 1 is a schematic diagram of a lithium detection system, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are used in an open-ended fashion, and thus should be interpreted to mean "including, but not limited to." Also, any use of any form of the terms "connect," "engage," "couple," "attach," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience but does not require any particular orientation of the components. As referred to here, "about" or "approximately" a value refers to ±0.5%, ±1%, ±2%, ±5%, ±10%, or ±20%.

Determination of the presence of lithium in mineral ore extraction is a challenge. Further, certain techniques for quantification of lithium concentration and mass in brine is also complex. Accordingly, it is presently recognized that it is advantageous to obtain an indication of the amount of lithium that could be extracted from a medium at a certain location, for instance to make a decision on exploitation and return on investment for such location.

Accordingly, this disclosure relates to techniques for detecting, measuring, or otherwise obtaining a concentration of lithium using nuclear measurements that may inform certain mineral extraction decisions (e.g., lithium extraction decisions), such as determining where to extract a lithium-containing brine. Certain aspects of this disclosure relate to using a neutron source to detect electrons indicative of a lithium concentration. It is presently recognized that it may be advantageous to utilize the relatively large cross-section (e.g., about 1,000 to 10,000 barn) for thermal neutron capture of the lithium-6 isotope (e.g., a lithium having a kernel with 6 particles-3 neutrons and 3 protons), which has an abundance of approximately 7.5% of natural lithium, to detect a lithium concentration. For example, lithium may react with neutrons to produce tritium as shown below:

$$^6Li + n \rightarrow {}^4He + {}^3H- + 5.8 \text{ MeV} \quad (1)$$

Tritium decays by an electron emission with a half-life of 12.33 years. Accordingly, the electrons may be detected using suitable detectors, such as beta-particle detectors (e.g., including proportional gas), scintillation detectors, semiconductor electron detectors, and other detectors capable of detecting electrons.

In general, the techniques may include a lithium detection apparatus having a radiation source and one or more detectors arranged in suitable positions to obtain a transmission or absorption measurement in solids and/or liquids that contain lithium. As described above, the radiation source may be a neutron source and the one or more detectors may be an electron detector. As described in more detail herein, in some embodiments, the radiation source may be an alpha particle source and the one or more detectors may be a neutron detector. Such a reaction (e.g., between an alpha particle and lithium) is described in more detail herein. In any case, the disclosed techniques may improve the accuracy of measurements for a relatively broad range of lithium concentrations (e.g., between approximately 1 ppm and 30,000 ppm, 1 ppm to 2000 ppm, 1 ppm to 10,000 ppm, or 1 ppm to saturation) in a relatively low volume. Although the disclosed embodiments are described as being implemented in a downhole tool, it should be noted that such techniques may also be implemented on the surface. In any case, the disclosed techniques provide techniques for determining lithium concentration, which may facilitate mineral extraction related decisions.

With the foregoing in mind, FIG. 1 shows an example of a lithium detection system 10. As shown, the lithium detection system 10 includes a vessel 12 holding a radiation source 14 and one or more detectors 16. In some embodiments, the lithium detection system 10 may be implemented in a downhole tool. In some embodiments, the lithium detection system 10 may be used in a fluid system that is uphole or on a surface. As described in more detail in FIG. 2, the vessel 12 may include flow control components, such as valves and pumps, that direct a fluid flow from a source (e.g., a subterranean reservoir) into the vessel 12. For example, the vessel 12 may include flow control components, such as fluid sampling modules that extract fluids from a subterranean formation. In some embodiments, the vessel 12 may include sample introduction components, such as conveyor belts or robotic arms that are capable of introducing a solid sample into the vessel 12.

As described herein, the radiation source 14 may include a neutron source 18 or an alpha particle source 20. As described in more detail herein, in embodiments when the radiation source 14 includes a neutron source 18, the detector 16 may include an electron detector 22. In embodiments when the radiation source 14 includes an alpha particle source 20, the detector 16 may include a neutron detector 24. In some embodiments, the radiation source 14 may include one or more neutron sources 18 and one or more alpha particle sources 20. In such embodiments, the detector 16 may include one or more electron detectors 22 and one or more neutron detectors 24.

As shown, the radiation source 14 and the detector 16 are arranged in different positions within the vessel 12 along the lateral axis 26 and the longitudinal axis 28 with the volume 30 of the vessel 12. It should be noted that the arrangement of the radiation source 14 and the detector 16 shown in FIG. 1 are meant to be non-limiting. In some embodiments, the detector 16 may arranged around one or more walls or a perimeter of the vessel 12 such that the detector 16 substantially surrounds the radiation source 14 (e.g., surrounds about 25%, about 30%, about 40%, about 50%, about 75%, about 90%, or about 95% of the area of the radiation source 14). For example, the detector 16 may be arranged in one or more radial positions about the radiation source 14. As such, the vessel 12 may have an area of 10 cm² or less, 15 cm² or less, 20 cm² or less, 30 cm² or less, or 100 cm² or less, and so on.

In general operation, the radiation source 14 may emit a particle, such as an alpha particle or a neutron, into the volume 30. The detectors 16 may detect an electron (e.g., when the emitted particle is a neutron) and/or a neutron (e.g., when the emitted particle is an alpha-particle). Accordingly, the detectors 16 may obtain measurements indicating a count of measured events (e.g., electrons or neutrons detected by the detectors 16). The measurements obtained by the one or more detectors 16 and/or operation of the radiation sources 14 may be received by a controller 32 to adjust, modify, or otherwise control operations of the lithium detection system 10 and/or lithium extraction system 42. As illustrated, the controller 32 includes a processor 34, memory 36, storage 38, and an input/output (I/O) port 40.

The processor 34 (e.g., processing circuitry) may be any type of computer processor or microprocessor capable of executing computer-executable code. While only one processor 34 is shown, in some embodiments, the controller 32 may include multiple processors 34 that may perform the operations described herein. The memory 36 (e.g., memory circuitry) and the storage 38 may be any suitable articles of manufacture that can serve as media to store processor-executable code, data, or the like. These articles of manufacture may represent computer-readable media (e.g., any suitable form of memory or storage) that may store the processor-executable code used by the one or more processors of the processor 34 to perform the presently disclosed techniques. As used herein, applications may include any suitable computer software or program that may be installed onto the controller 32 and executed by the processor 34. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal. The I/O ports 40 may be interfaces that may couple to other peripheral components, such as input devices (e.g., keyboard, mouse), detectors, input/output (I/O) modules, and the like.

In any case, the controller 32 may be control operation of a lithium extraction system 42 based on the measurements obtained by the detector(s) 16. In general, the lithium extraction system 42 may include a sampling system, a mineral extraction system (e.g., that obtains a lithium-containing sample, such as a solid or fluid), and so on. For example, the lithium extraction system 42 may be a downhole tool.

Figure 2:
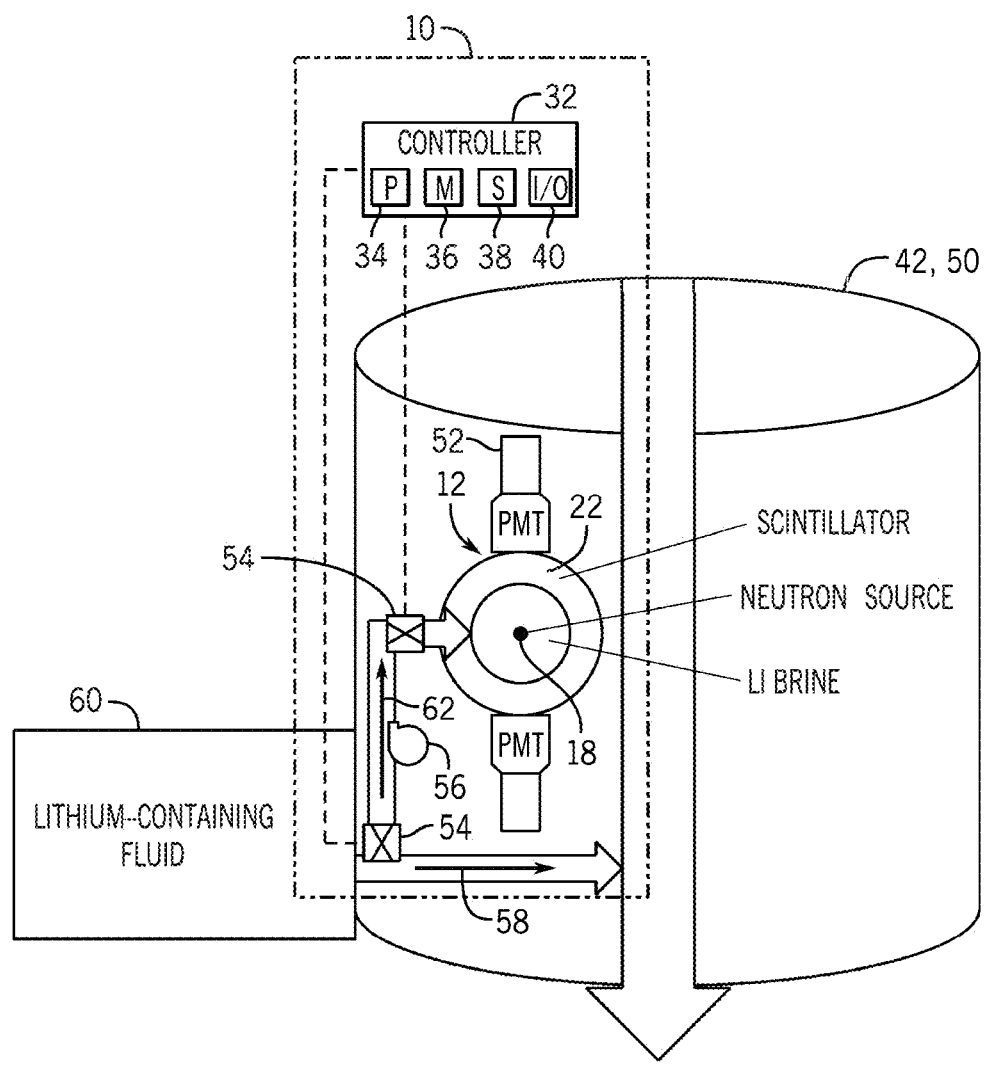
FIG. 2 is a schematic diagram of a downhole tool that includes an example of the lithium detection system of FIG. 1, in accordance with an aspect of the present disclosure.

As described herein, the lithium detection system 10 may be implemented in a downhole tool. To illustrate this, FIG. 2 shows a schematic diagram of a downhole tool 50 (e.g., a lithium extraction system 42) that includes the lithium detection system 10. In the illustrated embodiment, the lithium detection system 10 includes a neutron source 18, an electron detector 22, and a photomultiplier tube (PMT) 52. Further, the lithium detection system 10 includes the controller 32 (e.g., having the processor 34, the memory 36, the storage 38, and the I/O ports 40). As shown, the lithium detection system 10 also includes one or more valves 54 and one or more pumps 56 that are communicatively coupled to the controller 32, as discussed in more detail below. In some embodiments, the downhole tool 50 may include one or more shields/moderators in the vicinity of the neutron source configured to thermalize the neutrons emitted by the neutron source 18 before the neutrons reach the medium (e.g., that potentially includes lithium). In some embodiments, the downhole tool 50 may be conveyed by a conveyance line into a geological formation.

In operation, a fluid flow 58 (e.g., sample flow) from the lithium-containing fluid 60 (e.g., a subterranean reservoir, subsurface reservoir) may be directed into the downhole tool 50 via a fluid sampling module of the downhole tool 50. To obtain measurements of the lithium concentration in the lithium-containing fluid 60, the controller 32 may adjust (e.g., open or close) operation of the one or more valves 54 and/or the one or more pumps 56 to cause a sample fluid flow 62 to flow (e.g., along a flow path within a conduit) into the vessel 12 that includes the neutron source 18 and the electron detector 22. In some embodiments, the controller 32 may open the valves 54, such that the flow rate of the sample fluid flow 62 is within a threshold range (e.g., 10% or less, 20% or less, 30% or less, 40% or less, or 50% or less than the flow of the fluid flow 58). In some embodiments, the vessel 12 may be disposed along the fluid flow 58 as compared to in a bypass or otherwise a separate flow arrangement. Although only one vessel 12 is shown, it should be noted that the lithium extraction system 42 may include any suitable number of vessels 12, such as 2, 3, 4, 5, or more than 5. Although the vessel 12 is shown as being cylindrical or otherwise having a circular cross section, it should be noted that the vessel 12 may be any suitable shape, such as rectangular. In some embodiments, the dimensions of the vessel 12 (e.g., the length, the width, or the diameter) may be between about 20 to 30 cm. For example, the vessel 12 may have a diameter of about 20, about 21, about 22, about 23, about 24, about 25 cm, or so on. In some embodiments, the diameter may be between about 10 to 40 cm, 10 to 35 cm, 10 to 30 cm, or 15 to 30 cm. It should be noted that certain descriptions may also apply to a vessel 12 that receives a lithium-containing sample that is a solid. For example, the controller 32 may control a robotic arm that directs a solid sample into the vessel 12.

In any case, the lithium in the sample fluid flow 62 may interact with the neutrons. Put differently, the neutrons from the neutron source 18 may activate the lithium (e.g., lithium-6) in the brine, thereby producing tritium. The electrons produced by tritium may be detected by the electron detector 22. For example, when the electron detector 22 is a scintillator, the scintillation material of the scintillator may produce light due to the interaction with the scintillation material and the electrons (i.e., electrons having an energy above a threshold). The PMT 52 detects the light emitted by the scintillator, which is then counted and converted into a pulse height spectrum by the processor 34.

As described herein, the electron detector 22 may be any suitable electron detector capable of detecting electrons having any energy less than or equal to 19 keV, such as about 4 keV, 5 keV, 6 keV, or 8 keV. In some embodiments, the electron detector 22 may be a scintillator that include two or more different scintillation materials. It is presently recognized that it may be advantageous to use such scintillation materials because they may be easy to mold into different shapes.

In some embodiments, the one or more valves 54 may be one or more one-way valves. As such, the valve 54 may allow the sample flow 62 to flow into the vessel 12 until the vessel 12 is filled. In some embodiment, the processor 34 may periodically cause the neutron source 18 to activate. For example, in such embodiments, the neutron source 18 may be an on-demand neutron source (e.g., an electronic neutron generator, an electronic neutron source) as compared to a natural or synthetic neutron source.

Figure 3:
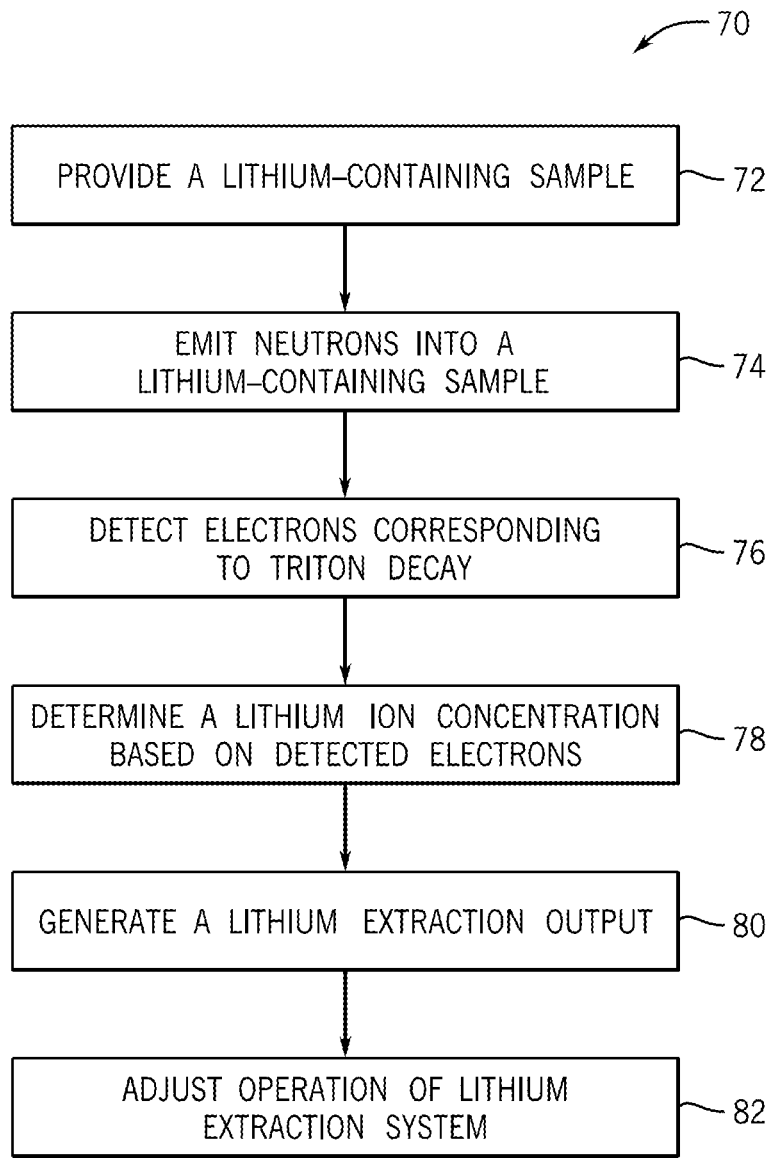
FIG. 3 illustrates a flow chart of a method for determining operational adjustments using the lithium detection system of FIG. 1 that includes a neutron source, in accordance with an aspect of the present disclosure.

FIG. 3 illustrates a flowchart of a process 70 for monitoring a lithium concentration (e.g., a lithium-ion concentration) within a sample (e.g., a lithium-containing brine stream) from a lithium-containing fluid 60. One or more blocks of the process 70 may be implemented by a processor 34 of the controller 32 for modifying operation of the lithium detection system 10 and/or the lithium extraction system 42 based on a measured lithium concentration by the lithium detection system 10. Although certain steps of the process 70 are described as being performed by the processor 34, it should be noted that any suitable processing device may be capable of performing the process 70. In some embodiments, one or more of the blocks may be omitted or performed in a different order than shown.

At block 72, the processor 34 provides a lithium-containing sample (e.g., a lithium-containing fluid, a lithium-containing brine, a lithium-containing solid) to a lithium detection system 10. For example, controller 32 may actuate one or more valves 54 to direct a sample fluid flow 62 and/or the fluid flow 58 into the vessel 12 that includes the radiation source 14 and the one or more electron detectors 22. It should be noted that in some embodiments, the lithium-containing sample may be a lithium-containing solid dispersed within a liquid (e.g., a slurry). In embodiments where the lithium-containing sample is a solid, the controller 32 may actuate, for example, a robotic arm to introduce a solid lithium-containing sample. Additionally or alternatively, if the lithium detection system 10 is implemented on the surface, the controller 32 may send a control signal that causes the lithium detection system 10 to determine a lithium ion concentration within a sample chamber (e.g., a vessel) and/or a direct measurement. For example, the lithium detection system 10 may be configured to directly measure the formation (e.g., the walls of a subterranean formation as opposed to measuring a sample within the downhole tool). In some embodiments, providing the lithium-containing fluid may include activating one or more fluid sample modules of a downhole tool. For example, a downhole tool 50 may be lowered into a wellbore to a particular depth. Once at the depth, the processor 34 may send a control signal that causes one or more fluid sample modules to activate, thereby providing the sample fluid flow 62 and/or the fluid flow 58 into the vessel 12.

At block 74, the processor 34 causes the radiation source 14 to emit neutrons into (e.g., towards) the lithium-containing sample within the vessel 12. For example, the controller 32 may activate one or more neutron sources 18 that cause neutrons to be emitted into the volume 30 of the vessel 12. At block 76, the electron detector 22 detects electrons corresponding to tritium decay. As described herein, it is presently recognized that lithium-6 present in the lithium-containing fluid may have a relatively high thermal capture cross section for interacting with neutrons. In turn, the neutrons may form tritium that decays to release electrons. In some embodiments, the processor 34 may activate other types of detection apparatus within the vessel 12. For example, a neutron measurement may be combined with one or more analytical measurements to determine a concentration of the lithium within the sample fluid flow 62.

At block 78, the processor 34 measures or determines a lithium ion concentration based on the detected electrons. For example, in some embodiments, the neutron measurement is used to determine that a lithium concentration is within a threshold range or above a threshold concentration (e.g., a minimum lithium concentration) in the vessel 12. In some embodiments, the processor 34 may determine a flow rate and/or volume of the sample fluid flow 62 and/or the fluid flow 58. As such, the processor 34 may utilize the flow rate and/or volume to determine an amount of lithium that has entered the downhole tool 50 via the fluid flow 58. In some embodiments, the processor 34 may obtain in situ measurements of the lithium ion concentration. That is, the processor 34 may record one or more multiple measurements of a lithium concentration over a time period to provide "on the fly" measurements of the lithium concentration. Such measurements may aid operators in making more rapid decisions based on the concentration of lithium. For example, the processor 34 may monitor a trend of the measured or determined lithium ion concentration, such as a rate of change of the lithium ion concentration. If the lithium ion concentration exceeds a threshold, the processor 34 may generate the lithium extraction output mentioned below such that it indicates the trend. In some embodiments, the processor 34 may take certain control actions based on the rate of change being above, below, or within a threshold (e.g., a lithium ion concentration rate threshold). For example, if the rate of change of concentration exceeds a threshold, the processor 34 may adjust the position of valves 54 to increase or toggle the fluid flow 58 within the downhole tool 50 (e.g., through a mud channel within the downhole tool 50). In some embodiments, the processor 34 may cause the lithium extraction system 42 to operate and extract fluid and/or solid from lithium containing geological formation and/or lithium-containing fluid 60. In this way, the processor 34 may determine the concentration of lithium over a predetermined time period or otherwise as the measurements are being recorded.

At block 80, the processor 34 may determine or generate a lithium extraction output based on the lithium concentration. In general, the lithium extraction output may include an alert or control signal that causes a modification to the operation of the lithium extraction system 42 (e.g., adjust a position of a valve 54 or speed of a pump 56). As such, the lithium extraction output may aid an operator or user in determining where there is a sufficient amount of lithium for extraction. In some embodiments, the processor 34 may detect electrons using the electron detectors and returning an indicator relative to an electron count (e.g., a number over a time period or a number per unit time (count rate)). As such, the processor 34 may relate the electron count (and thus tritium production) to an indication of the amount of lithium at location. This may be provided within the tool via the processor 34 or at control system at the surface based on communication of the electron count by the tool. For example, the processor 34 may transmit an alert to a separate computing device (e.g., a computing device on the surface as opposed to one downhole) if the electron count exceeds a threshold count. In some embodiments, the processor 34 may still transmit an indication (e.g., a visual indication or other alert) that indicates the electron count and/or whether the electron count is within a threshold or other data indicative of a lithium ion concentration in a sample.

At block 82, the processor 34 adjusts operation of the lithium detection system 10 and/or lithium extraction system 42 based on the lithium extraction output. For example, the processor 34 may output a control signal that causes an actuator to actuate, thereby modifying a position of valve 54 or other mechanical component of the lithium extraction system 42. For example, the processor 34 may determine that the concentration of lithium in the fluid flow 58 (e.g., a first fluid flow) exceeds a concentration threshold indicating it may be advantageous to continue or increase the flow rate of the fluid flow 58 into the lithium extraction system 42. As such, the lithium extraction output may be a control signal that reduces the speed of a pump 56 adjusts a position of a valve 54 (e.g., opens a valve), causes a display of a computing device to display an alert indicating the concentration of the lithium in the lithium-containing fluid 60 or amount of lithium that has entered the lithium extraction system 42.

As described above, in some embodiments, the disclosed techniques may include using an alpha particle source and one or more neutron detectors. It is presently recognized that it may be advantageous to utilize the relatively high interaction probability (e.g., about 128 mbarns at 5 MeV) between the lithium-7 isotope (e.g., a lithium having a kernel with 7 particles-3 neutrons and 3 protons), which has an abundance of approximately 92.5% of natural lithium, to detect a lithium concentration. For example, lithium may react with alpha particles (a) to produce a neutron as shown below:

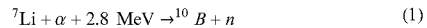
$$^7Li + \alpha + 2.8 \text{ MeV} \rightarrow {}^{10}B + n \qquad (1)$$

Interaction of lithium-7 with alpha particles above the threshold energy emits neutrons which can be detected using neutron detectors 24 as known in the art. For example, the radiation source 14 may be an Am-241 source that emits an alpha particle of 5.485 MeV. In some embodiments, the radiation source 14 may be a 100 uCi Am source, natural or synthetic alpha emitting radioisotopes (e.g., alpha-emitting source), electronic alpha particle generator, or other sources of alpha particles known by one of ordinary skill in the art. In some embodiments, the neutron detectors 24 may be He-3 detectors. The alpha particle from the radiation source 14 (e.g., alpha particle source 20) will travel a few microns before being captured by a lithium-7 atom, forming boron-10, and releasing a neutron (e.g., a fast neutron). The fast neutron produced may then travel several centimeters and then interact with one or more neutron detectors. Accordingly, the neutrons may be detected using suitable detectors, such as gas proportional detectors (e.g., $^3$He gas-filled proportional detectors, BF$_3$ gas-filled proportional detectors, boron lined detectors, and so on), scintillation neutron detectors (e.g., LiCaAlF$_6$-based scintillators, sodium iodide crystal co-dope with thallium and lithium (NaIL)-based scintillators, and so on), fast neutron detectors (e.g., 4-He based noble gas detectors), neutron activation detectors, or semiconductor neutron detectors (e.g., boron-based semiconductor detectors, such as BP, Bas, BN, B$_4$C). Although the disclosed embodiments are described as being implemented in a downhole tool, it should be noted that such techniques may also be implemented on the surface. In any case, the disclosed techniques provide techniques for determining lithium concentration, which may facilitate mineral extraction related decisions. In embodiments where the techniques are implemented in a downhole tool, the lithium detection system 10 may be fluidly coupled to a sampling apparatus, a packer, or other downhole components that may extract a sample (e.g., a lithium containing-fluid and/or lithium-containing solid) from a subterranean formation. In such embodiments, the processor 34 may utilize the measurements acquired by the lithium detection system 10 to generate an image or an element concentration map representing a distribution of the measured lithium concentration in multiple locations within the subterranean formation.

Figure 4:
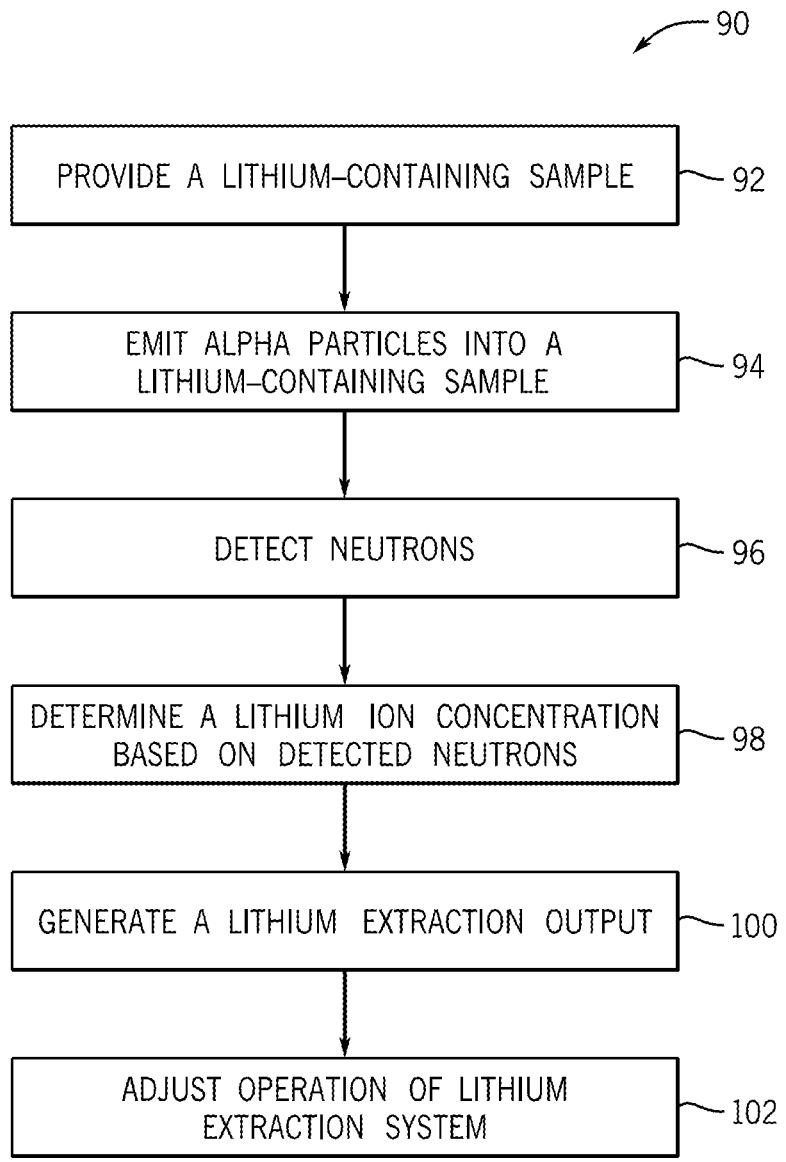
FIG. 4 illustrates a flow chart of a method for determining operational adjustments using the lithium detection system of FIG. 1 that includes an alpha particle source, in accordance with an aspect of the present disclosure.

With the foregoing in mind, FIG. 4 illustrates a flowchart of a process 90 for monitoring a lithium concentration (e.g., a lithium-ion concentration) within a fluid (e.g., a lithium-containing brine stream) from a lithium-containing fluid 60. One or more blocks of the process 90 may be implemented by a processor 34 of the controller 32 for modifying operation of the lithium detection system 10 and/or the lithium extraction system 42 based on a measured lithium concentration by the lithium detection system 10. Although certain steps of the process 90 are described as being performed by the processor 34, it should be noted that any suitable processing device may be capable of performing the process 90. In some embodiments, one or more of the blocks may be omitted or performed in a different order than shown. In general, the process 90 may be implemented using a tool similar to the downhole tool 50 of FIG. 2. However, the downhole tool 50 may include an alpha particle source 20 instead of, or in addition to, the neutron source 18. Further, the downhole tool 50 may include a neutron detector 24 instead of an electron detector 22. However, in some embodiments, the downhole tool 50 may include both a neutron detector 24 (i.e., and an alpha particle source 20) and an electron detector 22 (i.e., and neutron source 18). The measurements in such embodiments may be used in conjunction to improve the accuracy of detecting lithium.

At block 92, the processor 34 provides a lithium-containing sample (e.g., a lithium-containing fluid, a lithium-containing brine, a lithium-containing solid) to a lithium detection system 10. For example, the controller 32 may actuate one or more valves 54 to direct a sample fluid flow 62 and/or the fluid flow 58 into the vessel 12 that includes the radiation source 14 and the one or more detectors 16 (e.g., one or more neutron detectors 24). At block 94, the processor 34 causes the radiation source 14 to emit alpha particles into the lithium-containing brine within the vessel 12. For example, the controller 32 may activate one or more alpha particle sources 20 that cause alpha particles to be emitted into the volume 30 of the vessel 12. At block 96, the processor 34 detects neutrons corresponding to amount of lithium. As described herein, it is presently recognized that lithium-7 present in the lithium-containing sample may have a relatively high interaction probability with the alpha particles. In some embodiments, the processor 34 may activate other types of detection apparatus within the vessel 12. For example, a neutron measurement may be combined with one or more analytical measurements to determine a concentration of the lithium within the sample fluid flow 62. As such, it may be advantageous to perform a first set of measurements (e.g., in accordance with FIG. 3) in a first area of the vessel, and also perform a second set of measurements (e.g., in accordance with FIG. 4) in a second area (e.g., different from the first area) of the vessel 12. In such an embodiment, the first area may be separated from the second area such that the signals do not interfere with each other. In some embodiments, the first set of measurements and the second set of measurements may be initiated by processor 34 in a staggered manner (e.g., performed at different time periods).

At block 98, the processor 34 determines a lithium ion concentration based on the detected electrons. For example, in some embodiments, the neutron measurement is used to determine that a lithium concentration is within a threshold range or above a threshold concentration (e.g., a minimum lithium concentration) in the vessel 12. In some embodiments, the processor 34 may determine a flow rate and/or volume of the sample fluid flow 62 and/or the fluid flow 58. As such, the processor 34 may utilize the flow rate and/or volume to determine an amount of lithium that has entered the downhole tool 50 via the fluid flow 58. In some embodiments, the processor 34 may perform a background signal subtraction or otherwise a correction to remove background noise (e.g., arising from other particles and/or emissions that may at least partially overlap with the energy of the detected neutrons). In some embodiments, the processor 34 may detect neutrons using the lithium detection system 10 and return an indicator relative to a neutron count (either a number over a time period or a number per unit time (count rate)). As such, the processor 34 may determine or derive from the indicator (e.g., relative to the neutron count) an indication of the amount of lithium at location. This may be provided within the tool via the processor (software/firmware) or at surface or downhole based on communication capability of the neutron count by the tool.

At block 100, the processor 34 may determine or generate a lithium extraction output based on the lithium concentration. In general, the lithium extraction output may include an alert or control signal that causes a modification to the operation of the lithium extraction system 42 (e.g., adjust a position of a valve 54 or speed of a pump 56). As such, the lithium extraction output may aid an operator or user in determining where there is a sufficient amount of lithium for extraction.

At block 102, the processor 34 adjusts operation of the lithium detection apparatus based on the lithium extraction output. For example, the processor 34 may output a control signal that causes an actuator to actuate, thereby modifying a position of valve 54 or other mechanical component of the lithium extraction system 42. For example, the processor 34 may determine that the concentration of lithium in the fluid flow 58 (e.g., a first fluid flow) exceeds a concentration threshold indicating it may be advantageous to continue or increase the flow rate of the fluid flow 58 into the lithium extraction system 42. As such, the lithium extraction output may be a control signal that reduces the speed of a pump 56, adjusts a position of a valve 54 (e.g., opens a valve), and causes a display of a computing device to display an alert indicating the concentration of the lithium in the lithium-containing fluid 60 or amount of lithium in the lithium-containing fluid 60 that has entered the lithium extraction system 42.

In general, the process 90 may be implemented using a tool similar to the downhole tool 50 of FIG. 2. However, the downhole tool 50 may include an alpha particle source 20 instead of, or in addition to, the neutron source. Further, the downhole tool 50 may include a neutron detector 24 instead of an electron detector 22. It is presently recognized that it may be advantageous to form a relatively small (e.g., less than or equal to 1 cm, 2 cm, 3 cm, 4 cm, or 5 cm) gap or window in the downhole tool 50 to provide free streaming of alpha particles to the liquid or solid (e.g., ore) being interrogated or otherwise measured using the lithium detection system 10. For example, the neutron source 18 or alpha particle source 20 may emit the stream of neutrons or alpha particles into the vessel 12 via a window.

Technical effects of the present disclosure include techniques for determining lithium concentration of solids or liquids while downhole. For example, the techniques of the present disclosure may be used for in situ detection of lithium, as opposed to measuring the lithium concentration on the surface. This may allow operators to more quickly develop lithium extraction decisions. For example, the disclosed techniques may be utilized to obtain lithium concentration measurements at multiple depths during a downhole operation (e.g., logging-while-drilling). As such, the measurements by the disclosed lithium detection system may be used to control a downhole tool.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for determining a lithium ion concentration in a lithium-containing sample, comprising:
a downhole tool, the downhole tool including:
a vessel disposed in the downhole tool, the vessel configured to contain the lithium containing sample;
one or more neutron sources configured to emit neutrons, the one or more neutron sources disposed in the vessel; and
one or more electron detectors configured to detect electrons, wherein the one or more electron detectors are arranged around a perimeter of the vessel within the downhole tool; and
a control system comprising one or more processors, wherein the control system is configured to:
determine a lithium concentration based on the electrons; and
generate a lithium extraction output based on the lithium concentration.

2. The system of claim 1, further comprising one or more valves, wherein the control system is configured to adjust a position of the one or more valves to cause the lithium containing sample to enter the vessel.

3. The system of claim 1, wherein the one or more neutron sources are configured to emit the neutrons into a volume of the vessel.

4. The system of claim 1, wherein the one or more electron detectors comprise a scintillator and a photomultiplier tube.

5. The system of claim 1, wherein the lithium extraction output is configured to adjust operation of a lithium extraction system.

6. The system of claim 1, wherein the lithium-containing sample comprises a lithium-containing fluid, and wherein the vessel comprises one or more one-way valves that provide a flow path of the fluid into the vessel.

7. The system of claim 1, wherein the lithium extraction output comprises an in situ measurement of the lithium concentration.

8. The system of claim 1, wherein the downhole tool further comprises one or more alpha particle sources.

9. The system of claim 1, further comprising one or more shields configured to thermalize the neutrons emitted by the neutron source before the neutrons reach the lithium containing sample.

\* \* \* \* \*